Patented July 10, 1928.

UNITED STATES PATENT OFFICE.

1,676,729

BERTRAM ERWIN CROCKER, OF LOS ANGELES, CALIFORNIA.

PROCESS FOR MAKING SYNTHETIC CARBONACEOUS COKE BRIQUETTES FOR METALLURGICAL USES.

No Drawing. Application filed January 22, 1925. Serial No. 4,122.

This invention relates to a process and means for producing a synthetic metallurgical coke from the carbon residue obtained from petroleum, or hydrocarbons in the manufacture of oil gas.

An object is to produce a coke of the above mentioned character, which is porous but strong and weight resisting at the time of its combustion, but is nonporous and weight resisting prior to that time.

Another object is to provide a synthetic coke for metallurgical uses, which will have been made porous in the blast furnace by reason of the liberation of gases in the coke making material at lower furnace temperatures than the subsequent combustion temperature for which the coke is desired.

Further objects are to provide a process for making a synthetic metallurgical coke, which is inexpensive, use the carbon residue from hydrocarbons, and which is simple to perform.

Heretofore a metallurgical coke has never been formed from carbon residue obtained in the reduction of hydro-carbons, and my process is broadly new in that I provide pores or interstices in the pieces of compressed residue, by the liberation of a gas from a substance that is mixed with the residue.

The formation of the carbon residue in the manufacture of oil gas is well known and forms no part of this invention. The process of forming a carbon residue from oil is disclosed in Patent #883466 (U. S.) Mar. 31, 1908. The residue has about the following composition:

Moisture _____ about 4%
Volatile and combustible elements _____ about 11%
Fixed carbon _____ about 84%
Sulphur _____ about 0.5%
Ash _____ about 0.20%

This residue will hereinafter be termed carbon residue.

My process consists in molding and compressing the carbon residue in any well known type of briquette press, with pressures produced by those machines, and incorporating therewith a substance which will gasify or emit gas, when the molded residue is heated, moistened or acted upon by some other external element. This substance is preferably placed in a finely divided state, and is mixed with the carbon residue prior to the molding and pressing. The substance above mentioned may be any one or combination of the following or similar composition:

Limestone _____ $CaOCO_2$
Carbonate of iron _____ $FeCO_3$
Ferric oxide of iron _____ $Fe_2O_3$
Ferrous ferric _____ $Fe_3O_4$
Carbide of calcium _____ $CaC_2$ A typical example will now be given.

The limestone in finely divided particles is mixed with the carbon residue and molded and compressed in a power press, into a briquette, only sufficient pressure being employed to tightly pack the limestone and carbon residue together and make it strong structurally, and weight resisting. The briquettes are permitted to season in the open air. No definite proportion of limestone to residue is required in that the limestone does not co-act chemically with the carbon residue, therefore any amount of limestone may be used, the greater the amount the more will be the subsequent pitting. These briquettes are placed in the blast furnace in the usual way, and at about 800 degrees C. the $CO_2$ or gas radical frees itself, and causes a pitting of the briquette giving it a porous structure or in other words making a synthetic metallurgical coke. The CaO radical of the limestone is free to flux or clean the iron at a subsequent temperature of fusion. Any substance which will emit or form a gas under the action of some external element will cause the briquette to become porous and form a synthetic metallurgical coke.

The substance which is included with the carbon residue at the time the briquette is formed may be of such a nature as to melt or to fuse with the carbon or be consumed at temperatures below the combustion temperature of carbon. The combustion temperature of carbon being about 1400 degrees C. Also a substance which is of a less heat resisting power than the carbon, such as wood particles, wood shavings or other cellulose or organic substances, or derivatives, as pulp, which would be consumed in oxidizing atmosphere at lower temperatures than the compact carbon residue, or shrink by distillation, in either case leaving the main body of carbon residue, cellular; for use at subsequent combustion temperatures.

In the case of copper smelting the gas liberating substance could be the sulphur ores of copper and iron or the oxides in case of a roasted ore according to the calculation of the charge.

The porous briquette i. e., metallurgical coke may also be formed by introducing compressed air, gases or steam into the mold at the time the briquette is compressed, or the carbon residue may be crutched in a machine prior to compression.

The briquette may also be mechanically perforated by introducing spindles or needles into the briquette in one or many directions either during or after its compression in a press.

Having described my invention I claim:

1. The process of forming synthetic coke briquettes for subsequent use as a metallurgical coke from the carbon residue previously obtained from fluid hydrocarbons in the manufacture of oil gas; and comprises incorporating with said residue a gas liberating substance, then comprising and molding said residue and substance into a briquette and then causing gas to be liberated in the briquette by heating the briquette to a temperature to liberate the gas in said substance.

2. A synthetic coke briquette for subsequent use as a metallurgical coke in a method comprising a compacted briquette of carbon residue previously obtained from fluid hydrocarbons in the manufacture of oil gas, and an admixture of a gas liberating substance which liberates gas upon being heated.

3. The process of forming synthetic coke briquettes for subsequent use as a metallurgical coke from the carbon residue previously obtained from fluid hydrocarbons in the manufacture of oil gas; and comprises mixing limestone with said residue, compressing said residue and limestone into briquette then heating said briquette to a temperature to liberate gas in said substance and produce pores in the briquette.

4. The process of forming synthetic coke briquettes for subsequent use as a metallurgical coke from the carbon residue previously obtained from fluid hydrocarbons in the manufacture of oil gas; and comprises mixing iron ore with said residue, compressing said residue and iron ore into a briquette then heating said briquette to a temperature to liberate gas from said ore and produce pores in the briquette.

5. The process of forming synthetic coke briquettes for subsequent use as a metallurgical coke from carbon residue previously obtained from fluid hydro-carbons in the manufacture of oil gas; and comprises mixing a gas liberating substance with said residue, compressing the residue and substance into a briquette and heating the briquette to a temperature to liberate the gas in the substance and produce a porous structure.

6. The process of forming synthetic coke briquettes for subsequent use as a metallurgical coke from carbon residue previously obtained from fluid hydro-carbons in the manufacture of oil gas; and comprises mixing with said residue a substance which will be consumed at temperatures below the combustion temperature of the residue, then compressing said residue and substance into a briquette, then heating said briquette to a temperature to consume said substance.

7. A porous, weight resisting, synthetic briquette for subsequent use as a metallurgical coke and formed from the carbon residue of fluid hydrocarbons, and means mixed therewith which, upon heating, forms a porous briquette.

BERTRAM ERWIN CROCKER.